US012577716B2

(12) United States Patent
Wu et al.

(10) Patent No.: US 12,577,716 B2
(45) Date of Patent: Mar. 17, 2026

(54) DESICCANT-BASED LAUNDRY DEVICE

(71) Applicant: SAMSUNG ELECTRONICS CO., LTD., Gyeonggi-Do (KR)

(72) Inventors: Guolian Wu, Saint Joseph, MI (US); Raveendran Vaidhyanathan, Rockaway, NJ (US)

(73) Assignee: Samsung Electronics Co., Ltd., Suwon-si (KR)

( * ) Notice: Subject to any disclaimer, the term of this patent is extended or adjusted under 35 U.S.C. 154(b) by 818 days.

(21) Appl. No.: 17/971,545

(22) Filed: Oct. 21, 2022

(65) Prior Publication Data

US 2023/0407540 A1      Dec. 21, 2023

Related U.S. Application Data

(60) Provisional application No. 63/346,535, filed on May 27, 2022.

(51) Int. Cl.
| | |
|---|---|
| *D06F 29/00* | (2006.01) |
| *B01D 53/04* | (2006.01) |
| *B01D 53/18* | (2006.01) |
| *B01D 53/26* | (2006.01) |
| *B01D 53/28* | (2006.01) |
| *D06F 39/00* | (2024.01) |
| *D06F 39/04* | (2006.01) |
| *D06F 58/20* | (2006.01) |
| *D06F 58/30* | (2020.01) |

(52) U.S. Cl.
CPC ....... *D06F 29/005* (2013.01); *B01D 53/0438* (2013.01); *B01D 53/0446* (2013.01); *B01D 53/18* (2013.01); *B01D 53/261* (2013.01);

*B01D 53/263* (2013.01); *B01D 53/28* (2013.01); *D06F 39/00* (2013.01); *D06F 39/04* (2013.01); *D06F 58/20* (2013.01); *D06F 58/30* (2020.02); *B01D 2257/80* (2013.01)

(58) Field of Classification Search
CPC ........ D06F 29/005; D06F 58/30; D06F 39/04; D06F 39/00
USPC ............................................ 34/333, 595–610
See application file for complete search history.

(56) References Cited

U.S. PATENT DOCUMENTS

| | | | | | |
|---|---|---|---|---|---|
| 5,953,831 | A | * | 9/1999 | Yu | D06F 58/26 34/604 |
| 5,970,623 | A | * | 10/1999 | Tuggle | D06F 58/20 34/235 |

(Continued)

FOREIGN PATENT DOCUMENTS

| | | | | |
|---|---|---|---|---|
| CN | 112030492 | A | 12/2020 | |
| DE | 102010017104 | A1 * | 2/2011 ............. D06F 33/43 |

(Continued)

*Primary Examiner* — Stephen M Gravini

(57) ABSTRACT

A washer/dryer system includes a washer ventilation line, a dryer ventilation line, a washer, a dryer, and a ventilation reservoir. The washer ventilation line includes a washer air input line and a washer air output line. The dryer ventilation line includes a dryer air input line and a dryer air output line. The washer includes a washer drum connected to the washer ventilation line. The dryer includes a dryer drum connected to the dryer ventilation line. Each of the washer air input line, the washer air output line, the dryer air input line, and the dryer air output line are connected to the desiccant reservoir.

20 Claims, 13 Drawing Sheets

2008

204 — 202 —

210 — 206 —

Airflow      Airflow 240  238  228  236  228
238  222-2  236  222-1  226
230  220  214  218
234  232  224  232  208

212

(56)                 References Cited

U.S. PATENT DOCUMENTS

|  |  |  |  |  |
|---|---|---|---|---|
| 8,627,581 B2 * | 1/2014 | Brown | .................... | D06F 58/20 |
|  |  |  |  | 34/607 |
| 8,667,702 B2 * | 3/2014 | Ediger | .................... | D06F 58/20 |
|  |  |  |  | 68/5 R |
| 8,984,692 B2 * | 3/2015 | Balinski | .................. | D06F 33/43 |
|  |  |  |  | 8/149.1 |
| 11,261,560 B2 * | 3/2022 | Chudnovsky | ........... | F26B 17/18 |
| 11,598,044 B2 * | 3/2023 | Lee | ......................... | D06F 58/04 |
| 11,976,409 B2 * | 5/2024 | Graeser | ................... | D06F 58/20 |
| 12,173,447 B2 * | 12/2024 | Liu | ......................... | D06F 58/26 |
| 12,405,059 B2 * | 9/2025 | Davis | .................... | F26B 21/083 |
| 12,442,125 B2 * | 10/2025 | Bellinger | ................ | D06F 58/22 |
| 2003/0000106 A1 | 1/2003 | Anserson et al. |  |  |
| 2008/0053162 A1 | 3/2008 | Park et al. |  |  |
| 2011/0132043 A1 | 6/2011 | Kim |  |  |
| 2021/0254844 A1 | 8/2021 | Qasem et al. |  |  |
| 2023/0407540 A1 * | 12/2023 | Wu | .................... | B01D 53/0446 |
| 2024/0084500 A1 * | 3/2024 | Wu | ......................... | D06F 39/04 |

FOREIGN PATENT DOCUMENTS

| KR | 1221903 B1 | 1/2013 |
|---|---|---|
| KR | 101265598 B1 | 5/2013 |
| KR | 20210046300 A | 4/2021 |

* cited by examiner

105A

Conventional Electrical Dryer

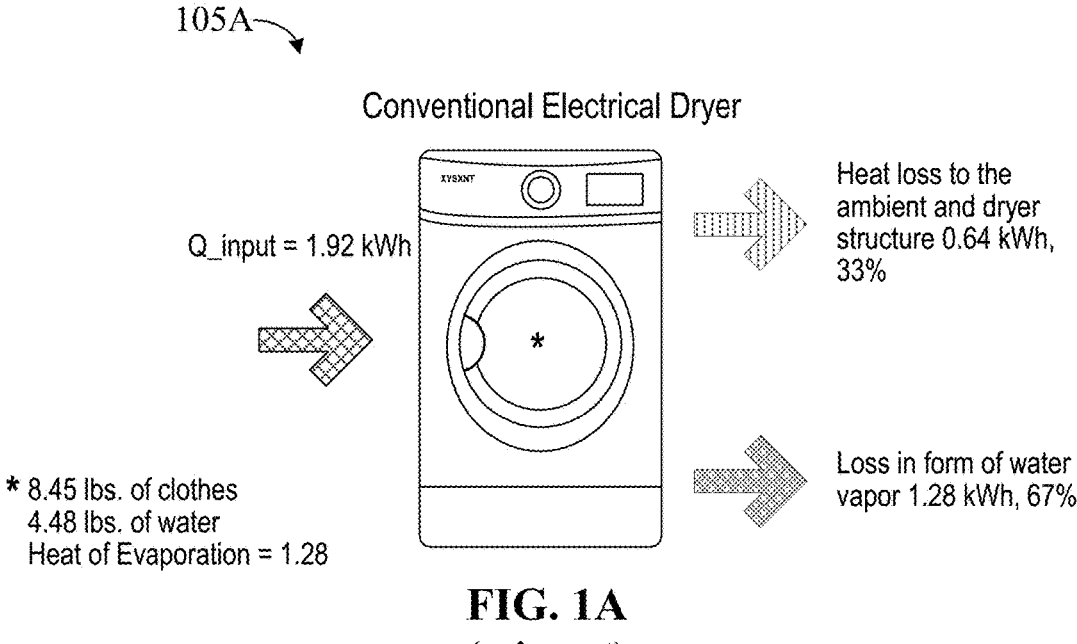

Q_input = 1.92 kWh

Heat loss to the ambient and dryer structure 0.64 kWh, 33%

Loss in form of water vapor 1.28 kWh, 67%

* 8.45 lbs. of clothes
  4.48 lbs. of water
  Heat of Evaporation = 1.28

Heat Pump Technologies

COP = Q_input/E_net input

E_net input

Heat Pump

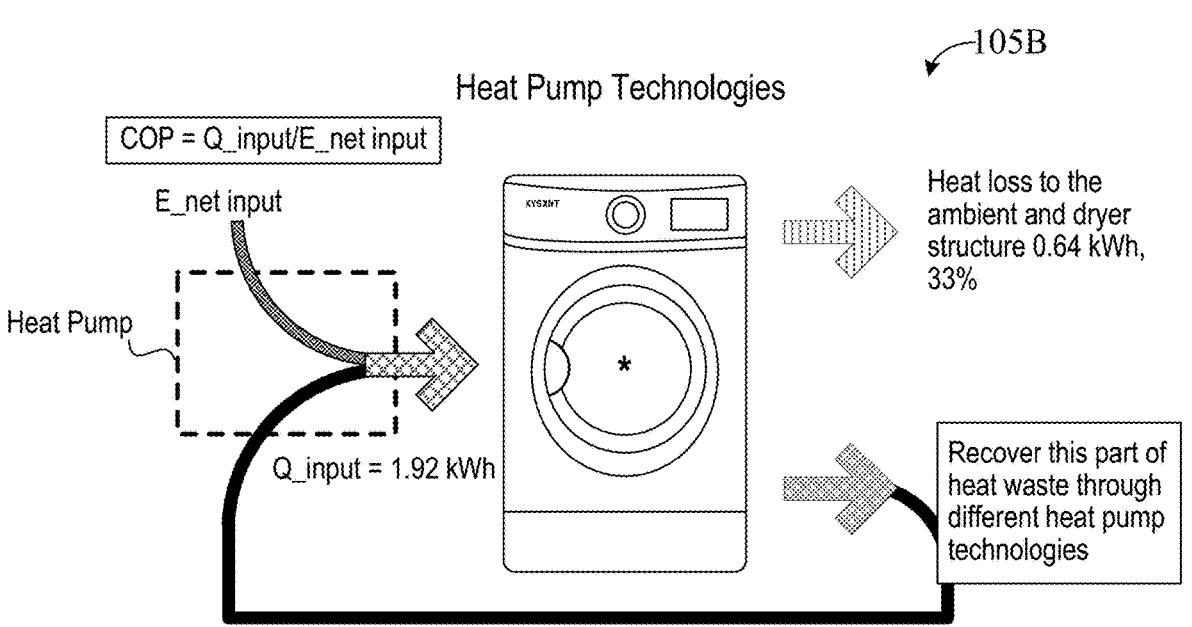

Q_input = 1.92 kWh

Heat loss to the ambient and dryer structure 0.64 kWh, 33%

Recover this part of heat waste through different heat pump technologies

* 8.45 lbs. of clothes
  4.48 lbs. of water
  Heat of Evaporation = 1.28

Activate drying cycle
410

Circulate air from dryer drum to desiccant
420

Measure dryness of air
430

End drying cycle
440

NO

YES

Close off air flow from dryer ventilation line to desiccant
450

Close off air flow from washer ventilation line to desiccant
490

YES

Circulate air from washer to desiccant
460

NO

Desiccant recharged?
485

Remove water from circulating air
470

Measure desiccant
480

500B

202

204

330

900

| Clothes Dryer Type | Clothes Weight (lbs) | Begin RMC | End RMC | Net Water Content (lbs) | Energy Needed to Evaporate Water (kWh) | Heat Needed Q_input (kWh) | COP (heating) | E_net_input (kWh) | Fan & Etc. | Heat Loss | Total Energy Use | Thermal Efficiency | CEF |
|---|---|---|---|---|---|---|---|---|---|---|---|---|---|
| Conventional Electric Dryer | 8.45 | 0.55 | 2% | 4.48 | 1.28 | 1.92 | 1.00 | 1.92 | 0.35 | 0.64 | 2.27 | 67% | 3.73 |
| Compressor Based HP Dryer | 8.45 | 0.55 | 2% | 4.48 | 1.28 | 1.92 | 2.50 | 0.77 | 0.35 | 0.64 | 1.12 | 67% | 7.57 |
| Thermoelectric HP Dryer | 8.45 | 0.55 | 2% | 4.48 | 1.28 | 1.92 | 1.50 | 1.28 | 0.35 | 0 | 1.63 | 67% | 5.19 |
| Desiccant HP Dryer/Washer | 8.45 | 0.55 | 2% | 4.48 | 1.28 | 1.92 | 6.39 | 0.2 | 0.35 | 0.64 | 0.64 | 67% | 13.26 |

FIG. 9

DESICCANT-BASED LAUNDRY DEVICE

CROSS-REFERENCE TO RELATED APPLICATIONS

This application claims priority to U.S. Provisional Patent Application No. 63/346,535, filed on May 27, 2022, the entirety of which is incorporated herein by reference.

TECHNICAL FIELD

This disclosure relates to laundry devices, and more particularly, to a dryer apparatus using a desiccant to remove water from laundry.

BACKGROUND

FIG. 1A illustrates a typical energy flow of a standard-sized, known electric clothes dryer 105A. A standard Department of Energy (DOE) energy test involves a single load of 8.45 lbs. of dry clothes weight and 4.48 lbs. of water contained in the wet clothes. The known electric clothes dryer 105A uses a minimum of 1.28 kWh of heat to dry the clothes by evaporating the 4.48 lbs. of water. With a heat loss of 0.64 kWh (i.e., a thermal efficiency of 67%), a total of 1.92 kWh of thermal energy would be needed as energy input to dry the clothes. This 0.64 kWh heat loss is thermal energy that is dissipated to ambient air, the dryer structure, and the air that is discharged (exhausted) to ambient air (e.g., the outdoors). Additionally, the fan and motor assembly (not illustrated) would consume additional energy of 0.35 kW, which results in a total energy consumption for the single load to be 2.27 kWh. This results in a final combined energy factor (CEF) of 3.73 lbs./kwh (8.45 lbs/2.27 kWh=3.73 lbs./kWh).

In the United States, an estimated $9 billion per year is spent on energy costs for drying clothes, which represents about 6 percent of annual residential electricity consumption. On average, clothes dryers use approximately 1.95 kWh of electricity per load, 46 kWh per month, and 551.6 kWh per year (based upon an assumption of 283 cycles/year). Accordingly, there is a need to improve the energy efficiency of clothes dryers.

FIG. 1B illustrates a known approach to improving the energy efficiency of a clothes dryer. Specifically, a compressor-based, heat pump clothes dryer 105B is provided. Heat pump clothes dryer 105B operates by recovering thermal energy contained in the water vapor that is discharged to ambient air. In a heat pump clothes dryer, the heat pump uses electrical energy "E_net_input" to recover energy from water vapor and deliver "Q_input" for actual clothes drying. Notably, the E_net_input is a fraction of Q_input (i.e., E_net_input=Q_input/COP, where COP is the Coefficient of Performance of the heat pump). Typically, a compressor-based heat pump for a clothes dryer has an average COP of 2.5, which results in a combined energy factor (CEF) of 7.57. By comparison, a thermoelectric heat pump, which has much lower average COP of 1.5, would have a 5.19 CEF. Thermoelectric heat pump clothes dryers have not been commercialized due to high component costs while only achieving moderate efficiency improvement. While compressor-based, heat pump clothes dryers are currently available in the marketplace, such clothes dryers are not commercially popular due to factors such as high cost, high system complexity, and refrigerant issues (e.g., cost and availability).

Accordingly, there remains a need to improve the energy efficiency of clothes dryers.

SUMMARY

In an example implementation, a washer/dryer system includes a washer ventilation line including a washer air input line and a washer air output line. The washer/dryer system includes a dryer ventilation line including a dryer air input line and a dryer air output line. The washer/dryer system includes a washer including a washer drum connected to the washer ventilation line. The washer/dryer system includes a dryer including a dryer drum connected to the dryer ventilation line. The washer/dryer system also includes a desiccant reservoir. Each of the washer air input line, the washer air output line, the dryer air input line, and the dryer air output line are connected to the desiccant reservoir.

The foregoing and other implementations can each optionally include one or more of the following features, alone or in combination. Some example implementations include all the following features in combination.

In another aspect, ambient air or air from the washer is circulated through the desiccant reservoir thereby recharging desiccant contained therein.

In another aspect, in a first configuration, a first fan is configured to cycle air through the dryer ventilation line. In a second configuration, a second fan is configured to cycle air through the washer ventilation line. In another aspect, the washer/dryer system includes a heater positioned within the washer ventilation line. In another aspect, the washer/dryer system includes a dehumidifier positioned within the washer ventilation line. In another aspect, the washer/dryer system includes a water reservoir for the washer. In that case, the dehumidifier is configured to introduce air from the washer air input line into water contained within the water reservoir.

In another aspect, the desiccant reservoir includes a molecular sieve desiccant.

In another aspect, the desiccant reservoir includes a liquid desiccant.

In another example implementation, a laundry device includes a ventilation line including an air input line and an air output line. The laundry device includes a drum connected to the ventilation line. The laundry device includes a dehumidifier. The laundry device also includes a desiccant reservoir. The air input line and the air output line are connected to the desiccant reservoir. The dehumidifier is connected to the desiccant reservoir.

The foregoing and other implementations can each optionally include one or more of the following features, alone or in combination. Some example implementations include all the following features in combination.

In another aspect, ambient air is circulated through the desiccant reservoir thereby recharging desiccant contained therein.

In another aspect, the laundry device includes a first fan configured to cycle air through the ventilation line. In another aspect, the laundry device includes a heater within the ventilation line. In another aspect, the dehumidifier is positioned within a washer ventilation line that connects the desiccant reservoir to a washer drum. In another aspect, the laundry device includes a second fan configured to pull ambient air through the desiccant reservoir. The drum is a dryer drum.

In another aspect, the laundry device includes a heater positioned within the ventilation line. The drum is a combination washer/dryer drum. The heater is configured to be operational during a washing cycle and non-operational in a drying cycle.

In another aspect, the desiccant reservoir includes a molecular sieve desiccant.

In another aspect, the desiccant reservoir includes a liquid desiccant.

In another example implementation, a method includes, during a drying cycle of a dryer system, cycling air, conveyed by a dryer ventilation line, from a dryer drum of the dryer system through a desiccant reservoir coupled to the dryer ventilation line. The method includes, during the drying cycle of the dryer system, cycling air from the desiccant reservoir back into the dryer drum. The method includes circulating ambient air through the desiccant reservoir thereby recharging a desiccant contained in the desiccant reservoir. In addition or in the alternative, the method includes circulating air from a washer conveyed through a washer ventilation line through the desiccant reservoir thereby recharging the desiccant contained in the desiccant reservoir.

The foregoing and other implementations can each optionally include one or more of the following features, alone or in combination. Some example implementations include all the following features in combination.

In another aspect, the method includes applying heat to the air in the washer ventilation line using a heater positioned in the washer ventilation line.

In another aspect, the method includes dehumidifying the air in the washer ventilation line using a dehumidifier positioned within the washer ventilation line.

In another example implementation, a method includes circulating air, via a dryer ventilation line of a laundry device, from a drum through a desiccant reservoir. The method includes circulating air through the desiccant reservoir and a dehumidifier back to the drum.

The foregoing and other implementations can each optionally include one or more of the following features, alone or in combination. Some example implementations include all the following features in combination.

In another aspect, the method includes circulating ambient air or air from a washer through the desiccant reservoir thereby recharging desiccant contained therein.

In another aspect, the method includes closing the dryer ventilation line responsive to a determination to end a drying cycle and circulating air, via a washer ventilation line and while the dryer ventilation line is closed, from a washer drum through the desiccant reservoir.

In another aspect, in a first configuration, a first fan is configured to cycle air through the dryer ventilation line. In a second configuration, a second fan is configured to cycle air through a washer ventilation line that includes the desiccant reservoir and the dehumidifier.

In another aspect, a heater is positioned within the washer ventilation line.

In another aspect, the drum is a dryer drum.

In another aspect, the drum is a combination washer/dryer drum.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

FIGS. 1A and 1B illustrate heat flows for a known electric clothes dryer and known heat pump-based clothes dryer, respectively.

FIG. 9 is a table comparing properties of various laundry drying technologies.

DETAILED DESCRIPTION

While the disclosure concludes with claims defining novel features, it is believed that the various features described herein will be better understood from a consideration of the description in conjunction with the drawings. The process(es), machine(s), manufacture(s) and any variations thereof described within this disclosure are provided for purposes of illustration and are not intended to be exhaustive or limited to the form and examples disclosed. The terminology used herein was chosen to explain the principles of the inventive arrangements, the practical application or technical improvement over technologies found in the marketplace, and/or to enable others of ordinary skill in the art to understand the embodiments disclosed herein. Further, the terms and phrases used within this disclosure are not intended to be limiting, but rather to provide an understandable description of the features described. Any specific structural and functional details described are not to be interpreted as limiting, but merely as a basis for the claims and as a representative basis for teaching one skilled in the art to variously employ the features described in virtually any appropriately detailed structure.

This disclosure relates to laundry devices, and more particularly, to a dryer apparatus. In accordance with the inventive arrangements described within this disclosure, a dryer apparatus is disclosed that is configured to use a desiccant to remove water from laundry. In one aspect, the dryer includes a dryer ventilation line that may be coupled to a desiccant reservoir. The dryer ventilation line facilitates the air flow that may cycle through desiccant contained in the desiccant reservoir and the dryer drum.

In another aspect, the dryer apparatus may be used in combination and/or coordination with a washer apparatus.

The washer apparatus includes a washer ventilation line that also may be coupled to the desiccant reservoir. The washer ventilation line facilitates the air flow that may cycle through desiccant contained in the desiccant reservoir and the washer drum. Further aspects of the inventive arrangements are described below with reference to the figures.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

Figure 2A:
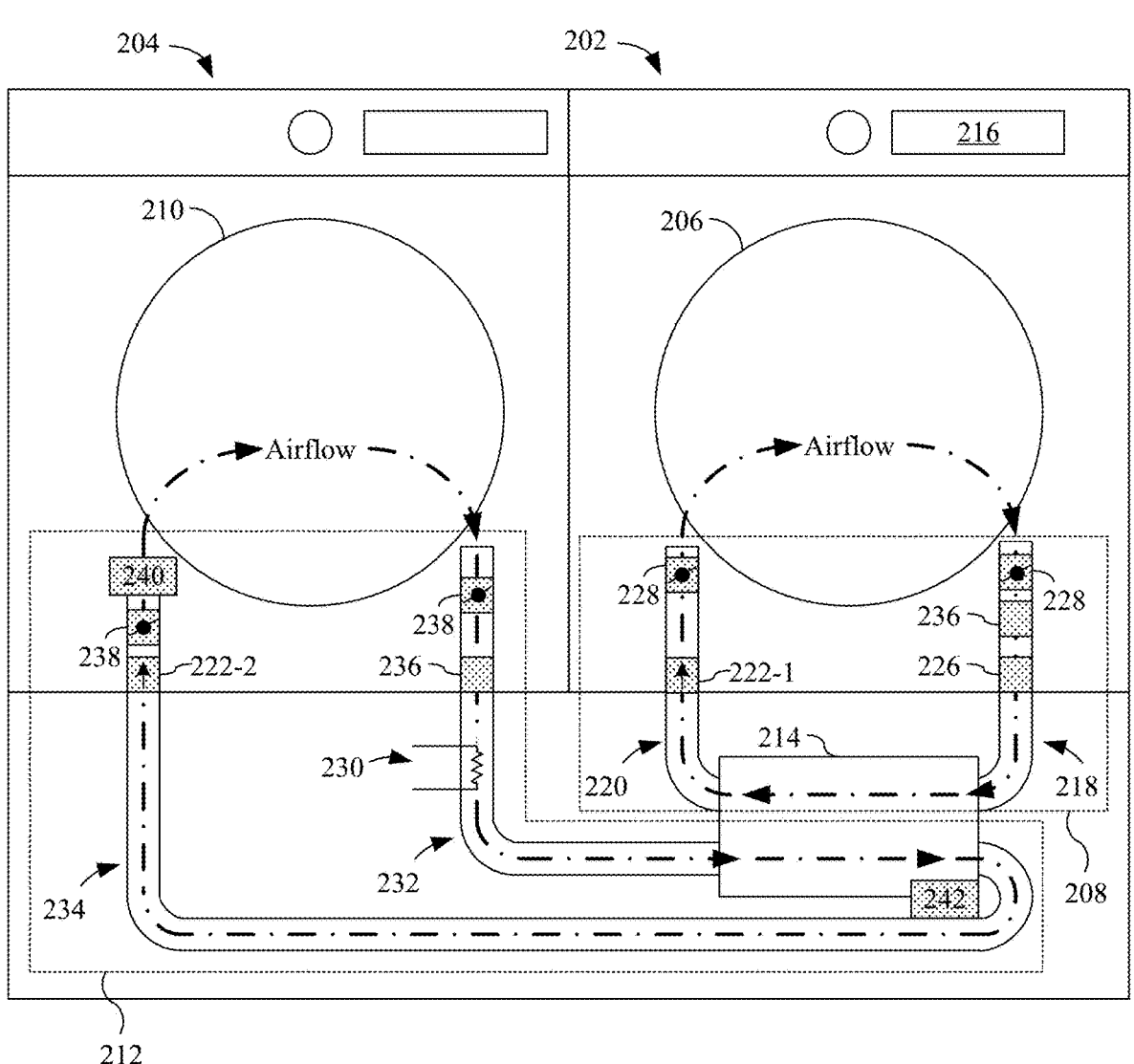
FIGS. 2A and 2B illustrate examples of desiccant-based washer/dryer systems in accordance with one or more embodiments.
Figure 2B:
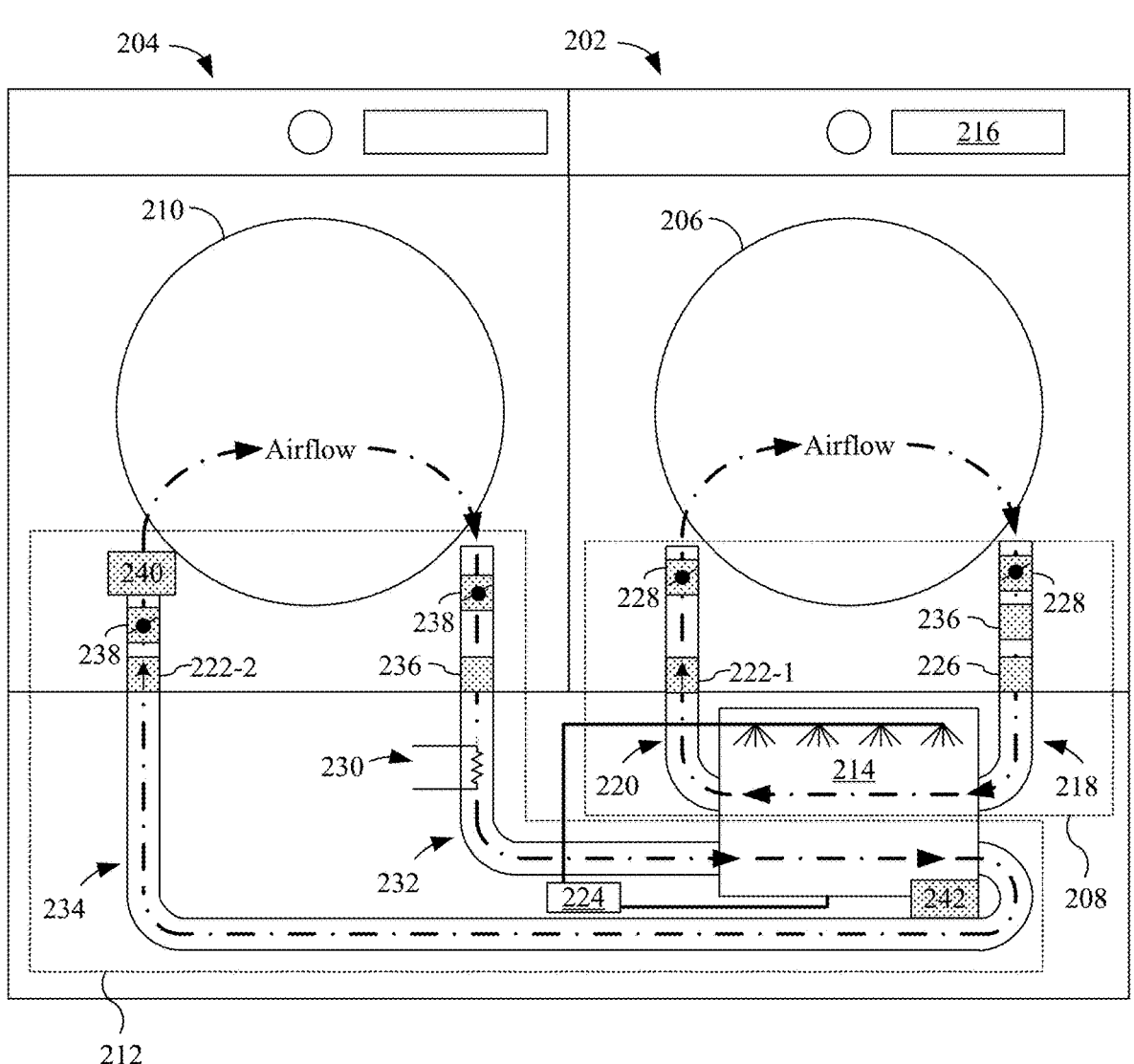

FIGS. 2A and 2B illustrate example desiccant-based washer dryer systems (systems) 200A, 200B, respectively. For purposes of illustration and ease of description, from-time-to-time, systems 200A and 200B are referred to herein collectively as desiccant-based washer dryer system (system) 200. System 200 includes a dryer 202 and a washer 204. Dryer 202 includes a dryer drum 206 and a dryer ventilation line 208. Washer 204 includes a washer drum 210 and a washer ventilation line 212. A desiccant reservoir 214 is included within system 200. Desiccant reservoir 214 may be included as part of dryer 202, as part of washer 204, or as a separate subsystem used by dryer 202 and/or washer 204. Dryer 202 and washer 204 are shown as being disposed on a base up on which dryer 202 and washer 204 may be stacked or otherwise disposed.

Dryer 202 is configured to implement a drying cycle where dryer 202 is activated (i.e., turned on) after a load of laundry (e.g., wet clothes, towels, etc.) is loaded into dryer drum 206 of dryer 202. Dryer 202 includes a controller 216. Using controller 216, certain settings of dryer 202 and/or washer 204 can be selected that determine the amount of time dryer 202 is to be operated or the amount of dryness to be achieved by dryer 202. These settings can be used to determine when the drying cycle ends.

Air from dryer drum 206 is circulated, via dryer ventilation line 208, through desiccant reservoir 214, and eventually back to dryer drum 206. Dryer ventilation line 208 includes a dryer air output line 218 that connects dryer drum 206 to desiccant reservoir 214 and conveys air out from dryer drum 206. Dryer ventilation line 208 includes a dryer air input line 220 that connects desiccant reservoir 214 to dryer drum 206 and conveys air into dryer drum 206.

Systems 200A, 200B are not limited as to a particular device used to drive air through dryer ventilation line 208. However, in certain aspects, fans 222, which may be mechanical fans (e.g., illustrated as fan 222-1 for dryer air input line 220 and as fan 222-2 for washer air input line 234) may be used. Additionally, systems 200A, 200B are not limited to a particular type of fan 222. For example, fans 222 may be implemented as axial flow fans or centrifugal fans. Additionally, other aspects of fans 222 may include fans 222 being implemented as a fan/motor assembly. In another aspect, fans 222 may be driven by the same motor that drives dryer drum 206 and/or washer drum 210 as the case may be.

Systems 200A, 200B are not limited as to the particular location of mechanical fans 222 within dryer ventilation line 208 and/or washer ventilation line 212. For example, fans 222 can be located either upstream and/or downstream of desiccant reservoir 214. However, in certain aspects, fan 222 is located downstream from desiccant reservoir 214. For example, as shown, fan 222-1 is disposed in/on dryer air input line 220. Fan 222-2 is disposed in/on washer air input line 234. In so doing, fans 222 will be advantageously exposed to lower humidity as compared to an implementation where fans 222 are located upstream of the desiccant reservoir 214 in dryer air output line 218 and/or in washer air output line 232. In particular, fans 222 would have a lower chance of failure in a lower humidity environment than in a higher humidity environment.

As used herein, the term "desiccant reservoir" refers to a combination of one or more desiccants along with a container that is configured to contain the one or more desiccants as well as to provide access to the one or more desiccants by at least one of dryer ventilation line 208 and washer ventilation line 212. Desiccant reservoir 214 also can include one or more dampers/valves (not illustrated) used to selectively close off desiccant reservoir 214 from the at least one of dryer ventilation line 208 and washer ventilation line 212. In one or more aspects, desiccant reservoir 214 can be an integrated part of the systems 200A, 200B. Alternatively, desiccant reservoir 214 can be attachable to/detachable from systems 200A, 200B. Additionally, desiccant reservoir 214 can be configured to provide external access (e.g., using a hatch (not shown)) to the one or more desiccants contained therein. A desiccant, as it is continually used and recharged, can lose its effectiveness in absorbing water over time. Consequently, there may be a need to replace some or all of the desiccant in desiccant reservoir 214 during the operational lifetime of systems 200A, 200B.

A desiccant is a hygroscopic substance that can be used to absorb water vapor in the air. As air is circulated through dryer drum 206, which includes water-laden laundry, the relative humidity (i.e., the amount of water vapor present) of the air increases. This high-humidity air is then introduced into desiccant reservoir 214 via dryer ventilation line 208 and dryer air output line 218. The desiccant in desiccant reservoir 214 removes (either via absorption or adsorption) water vapor from the air. In so doing, the desiccant releases heat energy, which increases the temperature of the air that is returned back to dryer drum 206 via dryer ventilation line 208 and dryer air input line 220. By removing water vapor from the air, the returned air also has a reduced relative humidity, which can then be used to absorb additional water vapor in dryer drum 206.

Systems 200A, 200B are not limited as to a particular type of desiccant(s) used in desiccant reservoir 214. Examples of desiccants that may be used include zeolites (microporous aluminosilicate mineral), montmorillonite (MMT) clay, silica gel, aluminophosphate molecular sieves (synthetic zeolite), calcium oxide, calcium sulfate, and activated carbon. Other examples of desiccants that may be used include metal-organic frameworks (MOF) absorbents (e.g., MOF-801).

The amount of desiccant needed will be based upon the adsorption properties of particular desiccant(s) selected to be used in the desiccant reservoir 214 and the intended maximum drying capacity (i.e., the amount of water capable of being removed from the laundry) of dryer 202. Other factors that impact the type and/or amount of desiccant needed include the desired dryness (e.g., as measured as percent relative humidity) of the air leaving dryer drum 206. For example, certain desiccants are more effective at a low relative humidity (e.g., 0-20%) than others. Additionally, certain desiccants have a greater carrying capacity (typically measured as a percentage of weight of water adsorbed relative to the weight of the desiccant) and thus are more efficient in removing water vapor from the air. Still further, desiccants have varying equilibrium capacity, which is the relative humidity at which a desiccant can no longer adsorb water vapor from air at a given temperature. Typically, as temperature is increased, the relative humidity (measured as a percentage) of the equilibrium capacity decreases.

There are many factors that could be used to select the desiccant in the desiccant reservoir. Examples of these factors include water-load capacity as characterized by water adsorption isotherms. Water adsorption isotherm is the amount of water that the desiccant can hold as a function of its pressure at constant temperature. In certain aspects, a large difference of adsorption isotherms between the desiccant loading temperature and regeneration temperature is desired. Another factor in selecting a desiccant is dust-free operation. If the desiccant generates dust during operation, the dust could contaminate the laundry. Yet another factor involves having a desiccant that has both reliable operation and a long period of service life.

While many desiccants are solid, desiccant reservoir 214 can be adapted to use liquid desiccants as illustrated in FIG. 2B. In the example of FIG. 2B, system 200B includes a solution pump 224. Solution pump 224 is capable of circulating the liquid desiccant through desiccant reservoir 214.

Dryness sensor 226 is capable of measuring the dryness of the air within dryer ventilation line 208. It should be appreciated that system 200 is not limited as to the particular type of dryness sensor used so long as the dryness sensor is capable of measuring/determining the dryness of the air. As used herein, "dryness" can be determined by temperature and/or humidity. Dryness of air can also be expressed in relative humidity and absolute humidity, and these can be measured by humidity and temperature sensors in one or more other embodiments.

System 200 may include one or more isolation mechanisms 228 that is/are capable of isolating dryer ventilation line 208 from desiccant reservoir 214. System 200 may include one or more isolation mechanisms 238 that is/are capable of isolating washer ventilation line 212 from desiccant reservoir 214. Isolation mechanisms 228, 238 may be controlled using controller 216. The particular isolation mechanism(s) for doing so are not limited to a particular approach. For example, the isolation mechanism(s) used to isolate dryer ventilation line 208 and/or washer ventilation line 212 from desiccant reservoir 214 may be implemented using actuating dampers/valves positioned within dryer ventilation line 208 and/or washer ventilation line 212.

System 200 may also support a recharge cycle. The desiccant recharge cycle does not necessarily immediately follow the drying cycle. Desiccants are limited in the amount of water vapor that can be adsorbed from air. Consequently, the desiccant needs to be recharged to allow the desiccant to get closer to its original capacity for adsorbing water vapor from the air. The process for recharging the desiccant within desiccant reservoir 214 includes circulating air from washer 204 and/or ambient air (i.e., air outside of the systems 200A, 200B) through desiccant reservoir 214 via washer ventilation line 212. Washer ventilation line 212 includes washer air output line 232 that connects washer drum 210 to desiccant reservoir 214 and conveys air out from washer drum 210. Washer ventilation line 212 includes a washer air input line 234 that connects desiccant reservoir 214 to washer drum 210 and conveys air into washer drum 210.

To remove water from the desiccant, the air being circulated through the desiccant must be within a particular temperature/relative humidity profile, which varies depending upon the type of desiccant being used. In general, the higher the temperature of the air, the greater the capacity of the air to remove water from the desiccant. Additionally, the lower the relative humidity of the air, the greater the capacity of the air to remove water from the desiccant.

To increase the ability of air within washer ventilation line 212 to remove water from the desiccant, a heater 230 can be provided to increase the temperature of the air prior to reaching desiccant reservoir 214. Systems 200A, 200B are not limited as to a particular type of heater. For example, heater 230 could be an electrical resistance heater or one based upon heat pump technology.

Water vapor taken up from desiccant reservoir 214 by the air can optionally be removed. This increases the ability of air within washer ventilation line 212 to remove water from the desiccant by decreasing the relative humidity of the air within washer ventilation line 212. As the air passes through desiccant reservoir 214 and takes up water from the desiccant, the air increases in relative humidity. If the air is recycled back into washer drum 210, humidity (i.e., water vapor) in the air can be reduced by exposing the air to a dehumidifier 240, which causes the water vapor to condense into liquid water. Advantageously, heat energy is released when water vapor condenses to liquid water. In so doing, some or all of the heat energy introduced by heater 230 can be recovered and introduced back into water used within washer 204.

As used herein, the term "humidifier" refers to any device configured to remove water (i.e., water vapor) from air. In one aspect, dehumidifier 240 can be a compressor-based dehumidifier that passes higher-humidity air over a water-cooled surface. However, systems 200A, 200B are not limited as to a particular type of dehumidifier for reducing the humidity. As another example, dehumidifier 240 can involve a combination of the washer ventilation line 212 passing the higher-humidity air from desiccant reservoir 214 through a water reservoir (e.g., by bubbling the air through the water reservoir via a submerged line). An example of this technique is illustrated in FIGS. 3B, 3C. As the higher-temperature and higher-humidity air passes through the lower-temperature water in the water reservoir, some of the water vapor in the air condenses and releases heat energy into the water, which acts to increase the temperature of this water. This heated water can optionally be used to supply water to washer drum 210 during a washing cycle.

One or both of dryer ventilation line 208 and washer ventilation line 212 can include an air filter 236 that can be used to prevent fabrics and lint from to desiccant reservoir 214. Additionally, the systems 200A, 200B are not limited to a type of air filter 236 examples of which include a screen filter, woven, or nonwoven filter.

Desiccant within desiccant reservoir 214 may be measured with a recharge sensor 242. For example, the recharge sensor 242 can measure the moisture content using moisture trips similar to those widely-used in known clothes dryers. An alternative approach for the recharge sensor 242 would involve monitoring the color of a color-changing desiccant.

Figure 3A:
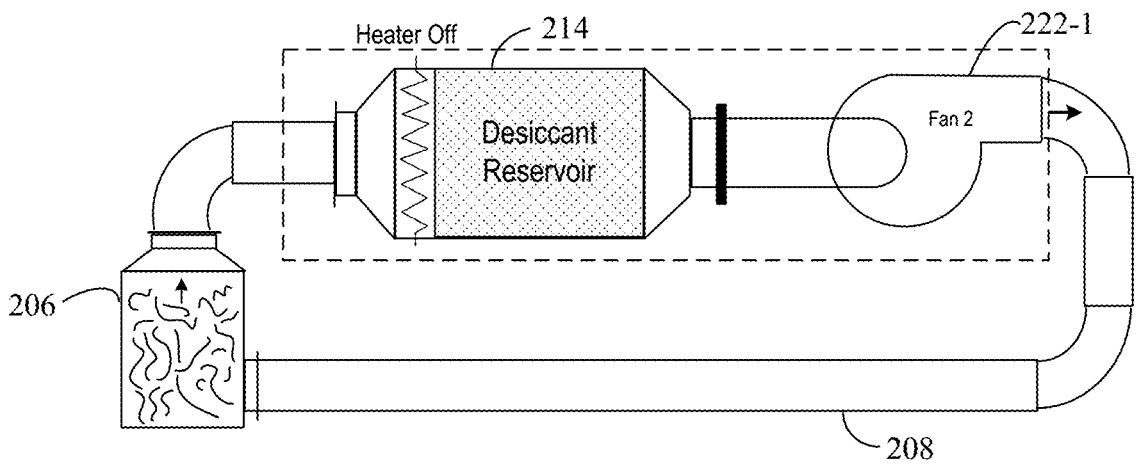
FIGS. 3A-3C illustrate further aspects of the washer/dryer system of FIGS. 2A and 2B in accordance with one or more embodiments.
Figure 3B:
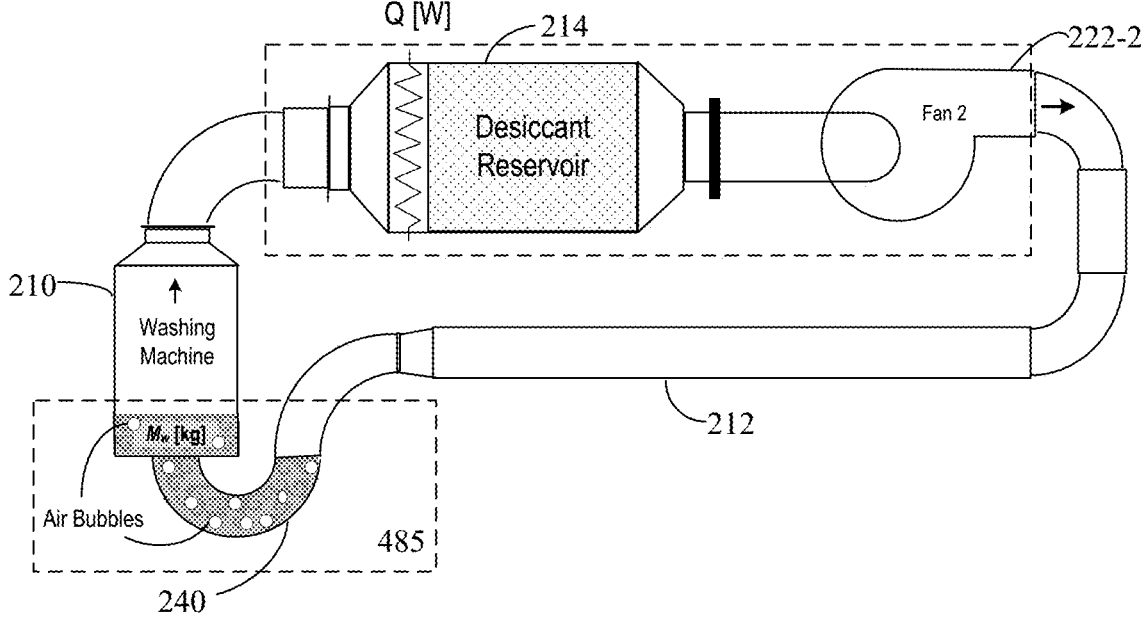
Figure 3C:
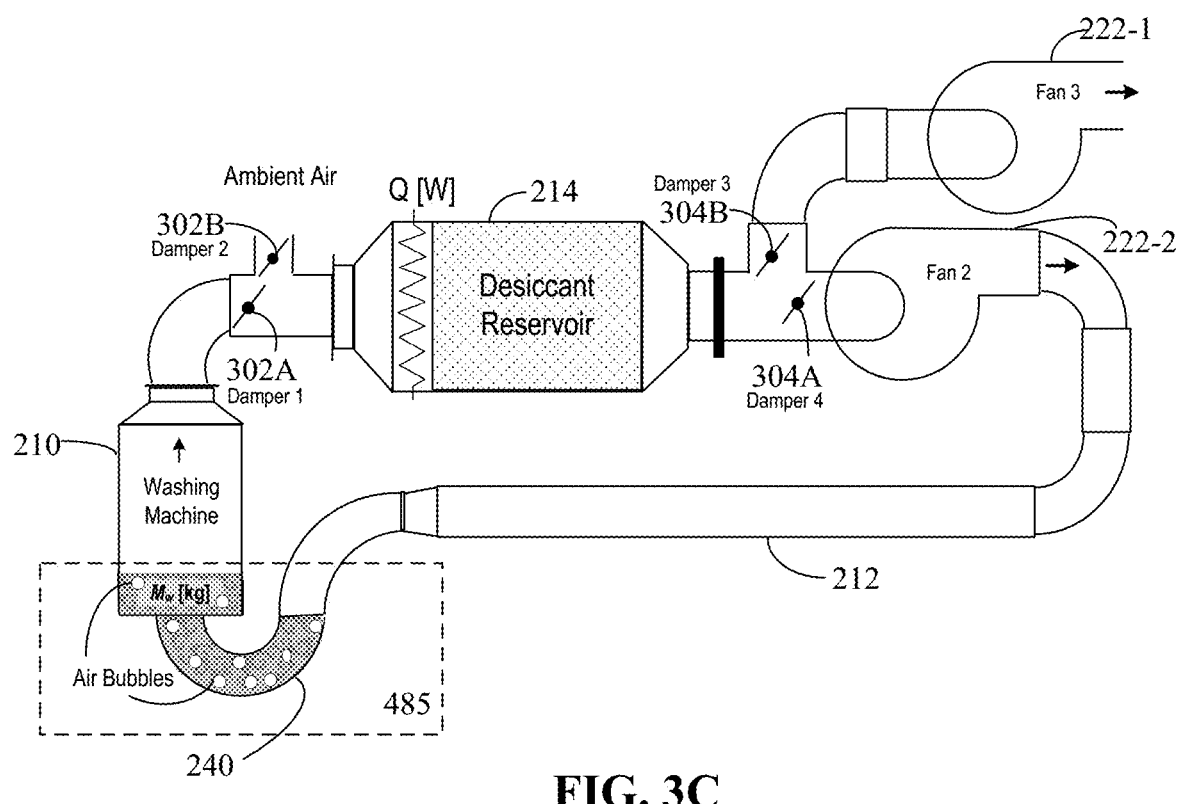

FIGS. 3A and 3B respectively illustrate further aspects of dryer ventilation line 208 (FIG. 3A) and washer ventilation line 212 (FIG. 3B). Referring to FIG. 3B, dehumidifier 240 is configured to introduce air from washer air input line 234 of washer ventilation line 212 into water contained within a water reservoir that supplies water to washer drum 210.

Regardless of the type of dehumidifier 240 employed, the air exiting dehumidifier 240 can be returned to washer drum 210 and subsequently reintroduced into washer ventilation line 212 or exhausted into ambient. An alternative approach would be to partially exhaust the dehumidified air into ambient. If the dehumidified air is completely or partially exhausted into ambient, washer air output line 232 of washer ventilation line 212 can take up air from either washer drum 210 and/or ambient.

FIG. 3C illustrates a hybrid approach to washer ventilation line 212 in which ambient air or air from washer drum 210 can be used to recharge the desiccant within desiccant reservoir 214. In one configuration, dampers/valves 302A, 304A are open and dampers/valves 302B, 304B are closed. This configuration is comparable to the configuration illustrated in FIG. 3B. However, in another configuration, dampers/valves 302A, 304A are closed and dampers/valves 302B, 304B are open. In this configuration air is drawn from the ambient and can be used to recharge the desiccant within desiccant reservoir 214. This configuration is similar to the configuration illustrated in FIG. 7B. Depending upon the relative efficiencies of each configuration, a recharge cycle may employ both configurations of varying length.

Figure 4:
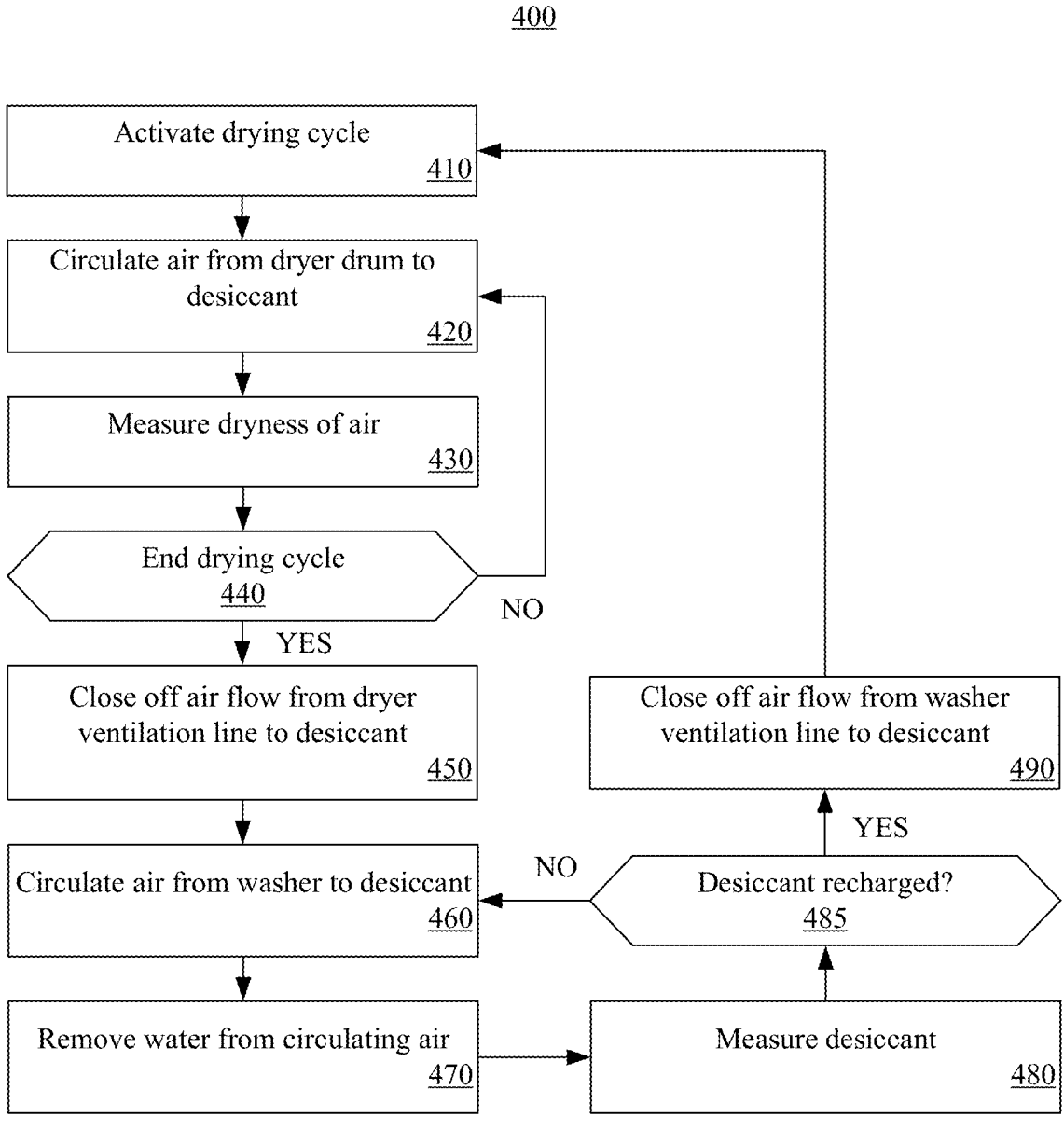
FIG. 4 is a flowchart of an example method of using the desiccant-based washer/dryer system of FIGS. 2A and 2B in accordance with one or more embodiments.

FIG. 4 is a flowchart of an example method 400 of using the desiccant-based washer/dryer system of FIGS. 2A and 2B in accordance with one or more embodiments. The operations described in connection with FIG. 4 may be performed and/or initiated under the control of controller 216 as described herein in connection with FIGS. 2A and/or 2B.

Beginning in block 410, the drying cycle (e.g., blocks 410-440) begins with dryer 202 being activated (i.e., turned on) after a load of laundry (e.g., wet clothes, towels, etc.) is loaded into dryer drum 206 of dryer 202. In block 420, air from the dryer drum 206 is circulated, via a dryer ventilation line 208, through a desiccant reservoir 214, and eventually back to the dryer drum 206. In block 430, the dryness of the air within the dryer ventilation line 208 can be measured using dryness sensor 226.

In block 440, a determination is made whether to end the drying cycle, and the systems 200A, 200B is not limited as to a particular approach in making this determination. In one or more example implementations, the drying cycle of systems 200A, 200B can end based upon a preset amount of time passing or based upon a measured humidity level of the air from dryer drum 206. For example, using information provided by dryness sensor 226, a determination can be made, e.g., using controller 216, to end the drying cycle after the relative humidity reaches a preset amount that is either selected manually (i.e., by the user) are determined automatically (e.g., based upon a user-selection of the type of material being dried). If a determination is made not to end the drying cycle, the process returns to block 420.

In block 450, after the determination is made to end the drying cycle, dryer ventilation line 208 can be isolated from the desiccant reservoir 214 using isolation mechanisms 228 (e.g., dampers/valves 302, 304). Systems 200A, 200B are not limited to a particular approach for implementing the isolation described. In block 460, controller 216 initiates a desiccant recharge cycle (e.g., blocks 460-485). As noted, although the desiccant recharge cycle is illustrated as occurring after the drying cycle (e.g., 410-440), the desiccant recharge cycle does not necessarily immediately follow the drying cycle.

In block 470, water vapor taken up from desiccant reservoir 214 by the air can optionally be removed. This increases the ability of air within the washer ventilation line 212 to remove water from the desiccant by decreasing the relative humidity of the air within the washer ventilation line 212. As the air passes through the desiccant reservoir 214 and takes up water from the desiccant, the air increases in relative humidity. If the air is recycled back into the washer drum 210, humidity (i.e., water vapor) in the air can be reduced by exposing the air to a dehumidifier 240, which causes the water vapor to condense into liquid water. Advantageously, heat energy is released when water vapor condenses to liquid water. In so doing, some or all of the heat energy introduced by heater 230 can be recovered and introduced back into water used within washer 204.

In block 480, the desiccant within desiccant reservoir 214 is measured with recharge sensor 242. For example, recharge sensor 242 can measure the moisture content using moisture trips similar to those widely-used in known clothes dryers. An alternative approach for the recharge sensor 242 would involve monitoring the color of a color-changing desiccant.

In block 485, a determination is made whether to end the recharge cycle, and system 200 is not limited as to a particular approach in making this determination. The temperature and humidity of the air at exit of desiccant reservoir 214 and the moisture content of desiccant change over time during the recharge cycle, and controller 216 can determine an end point of the recharge cycle based on air temperature, humidity, and the moisture content of desiccant (e.g., using an output of moisture trip embedded in desiccant). If a determination is made not to end the drying cycle, the process returns to block 460.

In block 490, after the determination is made to end the recharge cycle, washer ventilation line 212 can be isolated from desiccant reservoir 214, and system 200 is not limited to a particular approach for doing so. For example, the isolation of washer ventilation line 212 from desiccant reservoir 214 can be accomplished using actuating dampers/valves (e.g., isolation mechanisms 238) positioned within the washer ventilation line 212.

Figure 5A:
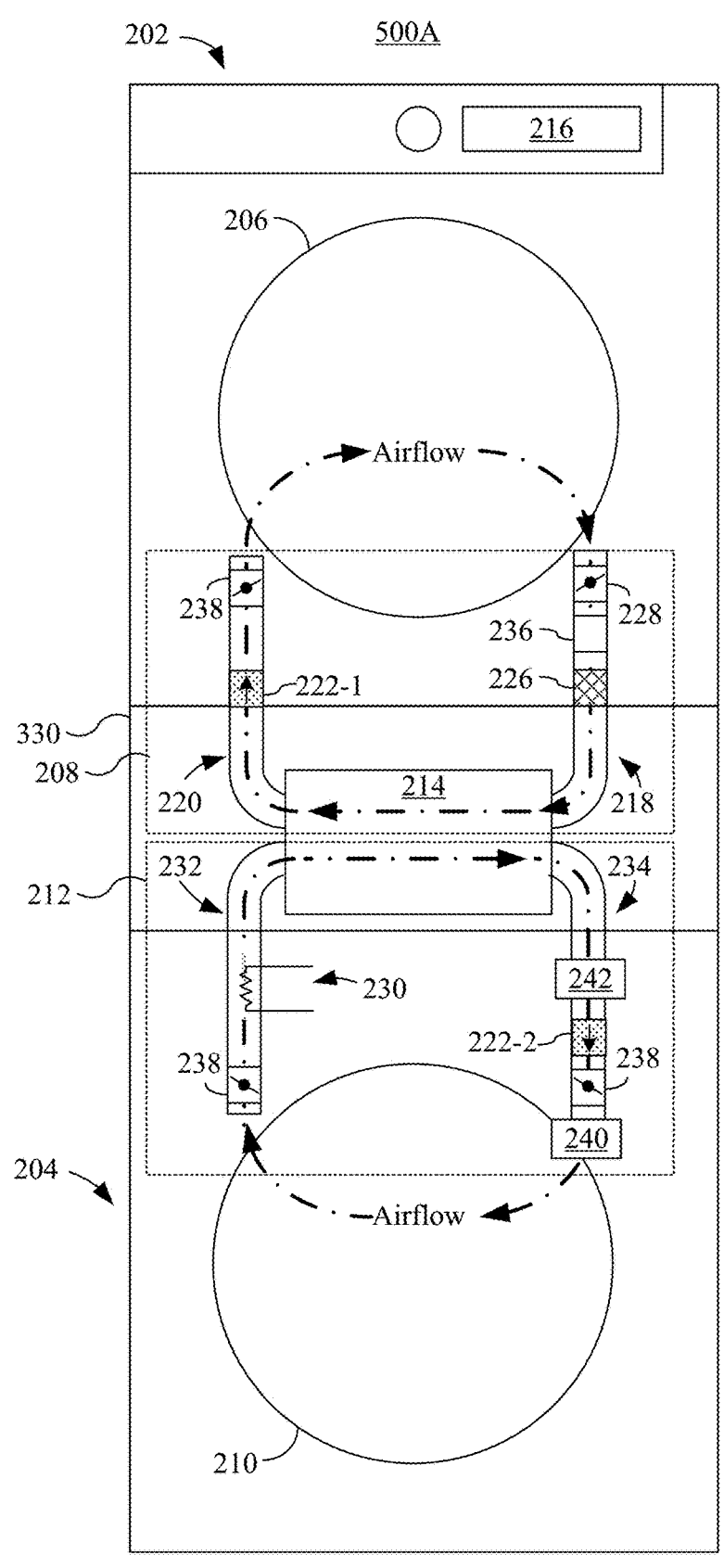
FIGS. 5A and 5B illustrate a vertical or stackable arrangement of a washer and a dryer in accordance with one or more embodiments.
Figure 5B:
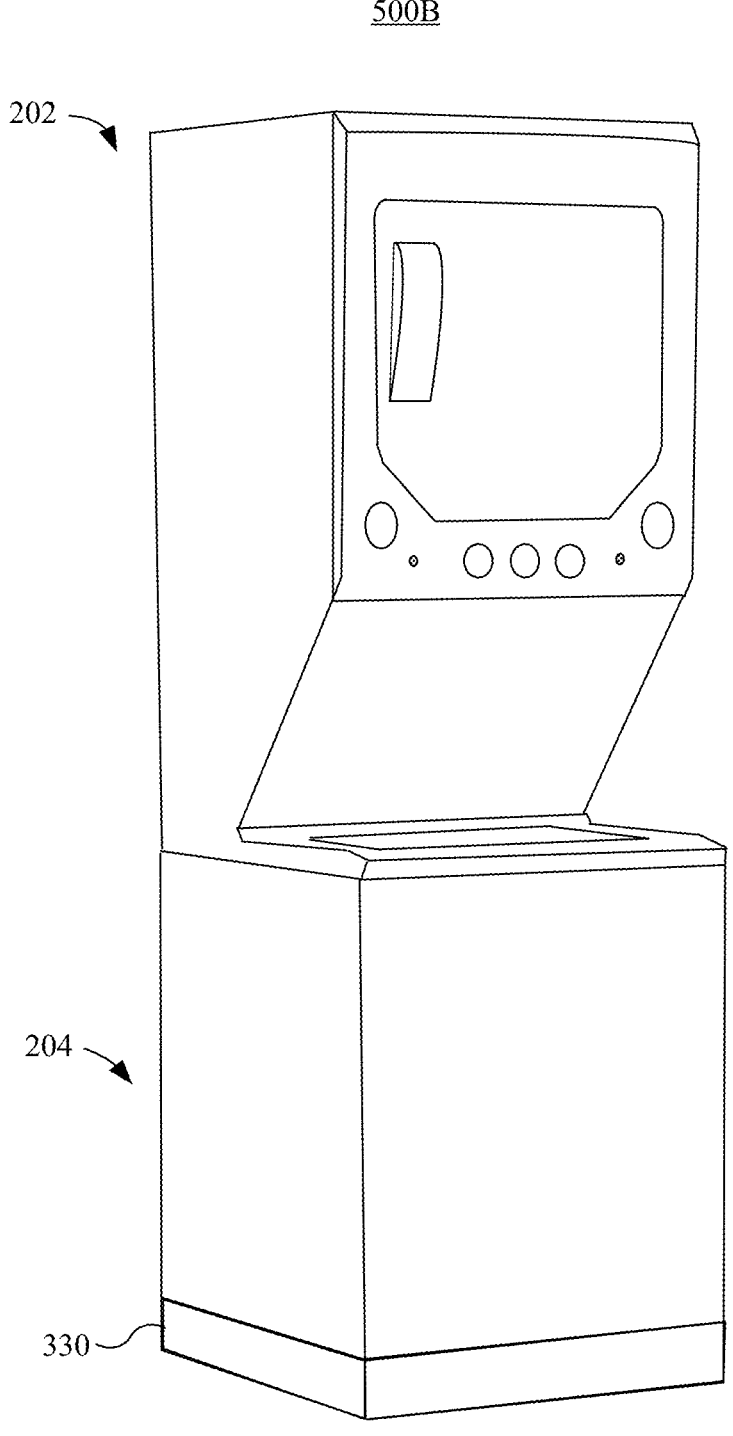

FIGS. 5A and 5B illustrate alternative aspects of the systems 200A, 200B. Specifically, while FIGS. 2A, 2B illustrate a side-by-side arrangement of washer 204 and dryer 202, FIGS. 5A, illustrate a vertical or stackable arrangement of washer 204 and dryer 202.

Figure 6:
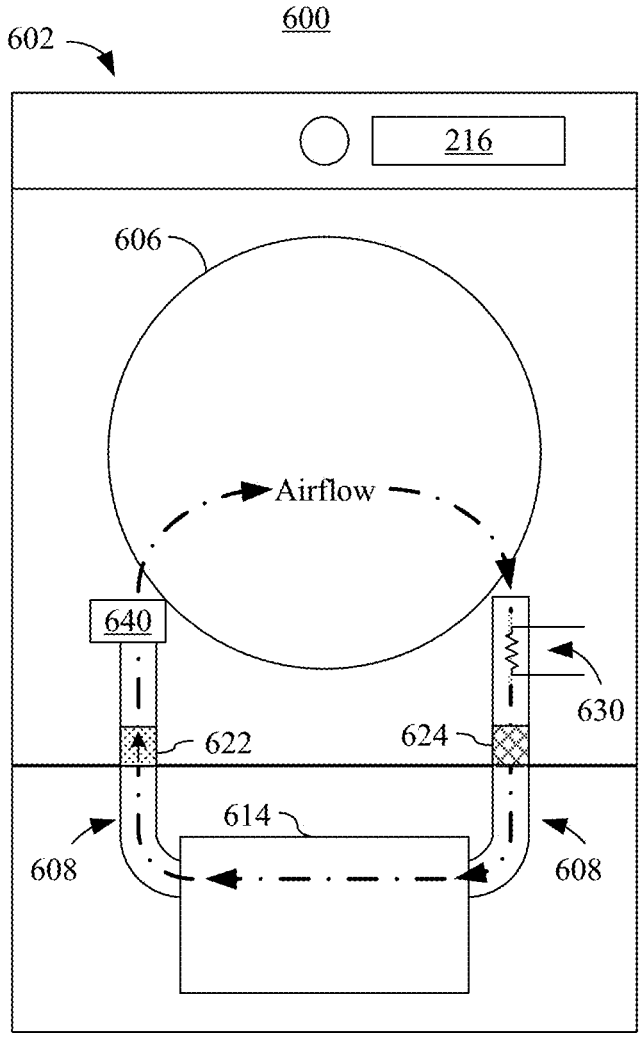
FIG. 6 illustrates an all-in-one washer/dryer combination in accordance with one or more embodiments.

FIG. 6 illustrates an example of a washer/dryer combination 600. For ease of reference, all of the devices described herein including the washer/dryer combination 600 illustrated in FIG. 6 can be referred to as "laundry devices."

Laundry devices 500A, 500B are substantially similar to systems 200A, 200B, and their operation can also be described using the method 400 illustrated in FIG. 4. Similar to the systems 200A, 200B, laundry devices 500A, 500B can include the elements of dryer 202, dryer drum 206, washer 204, washer drum 210, desiccant reservoir 214, heater 230, dryer fan 222-1, dryer ventilation line 208, washer fan 222-2, washer ventilation line 212, dryness sensor 226, recharge sensor 242, and dehumidifier 240. The discussion above regarding these elements as it pertains to systems 200A, 200B, also applies to laundry devices 500A, 500B.

In the example of FIG. 5A, a housing 330 contains certain components such as desiccant reservoir 214. Housing 330 further facilitates coupling of dryer 202 and washer 204 through stacking. In one or more arrangements, housing 330 may be capable of securing dryer 202 and washer 204.

In the example of FIG. 5B, housing 330 is located at the bottom of washer 204. Still, housing 330 contains certain components such as desiccant reservoir 214 and portions of dryer ventilation line 208 and washer ventilation line 212 to facilitate the air flows described herein.

Referring again to FIG. 6, washer/dryer combination 600 is substantially similar to systems 200A, 200B with certain exceptions, and their operation can also be described using method 400 illustrated in FIG. 4. Similar to systems 200A, 200B, laundry device 600 can include a desiccant reservoir 614, heater 630, and dehumidifier 640.

The exceptions include that the dryer and dryer drum as well as the washer and washer drum are combined into a unit 602 having a single drum 606. Thus, the dryer ventilation line and washer ventilation line can be combined into a single ventilation line 608. With only a single ventilation line 608 provided, instead of a pair of fans, the washer/dryer combination 600 need only include a single fan 622. Also, as illustrated, the dryness sensor and recharge sensor are combined into a single sensor 624 although these two sensors could remain separate. The discussion above regarding these elements as it pertains to systems 200A, 200B also applies to the washer/dryer combination 600.

With regard to the washer/dryer combination 600 illustrated in FIG. 6, there would be no need to close off the ventilation line 608 since the ventilation line 608 is used in both the drying cycle and recharge cycle. In the example of FIG. 6, block 450 of FIG. 4 may be considered part of the drying cycle or a point of demarcation between the drying cycle and the recharge cycle.

Figure 7A:
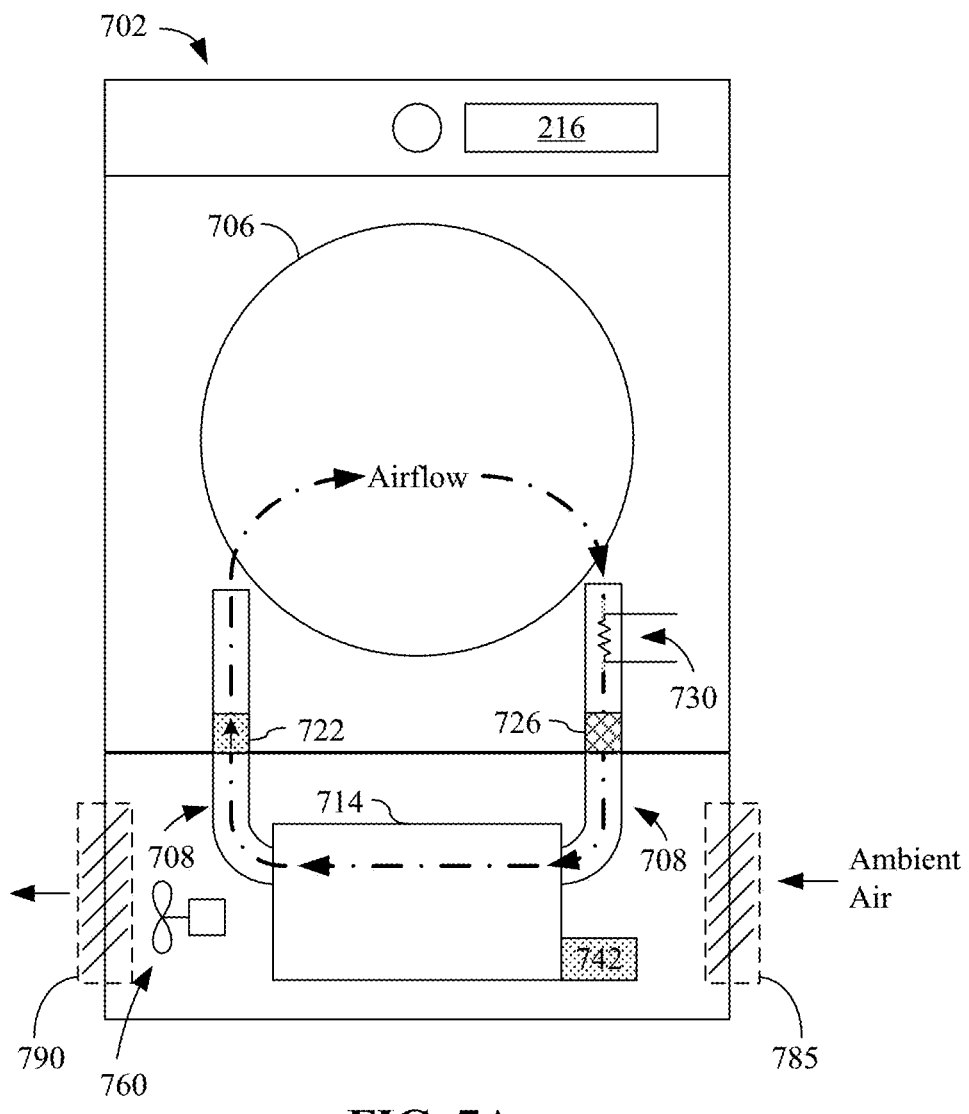
FIGS. 7A and 7B illustrate a desiccant-based dryer in accordance with one or more embodiments.
Figure 7B:
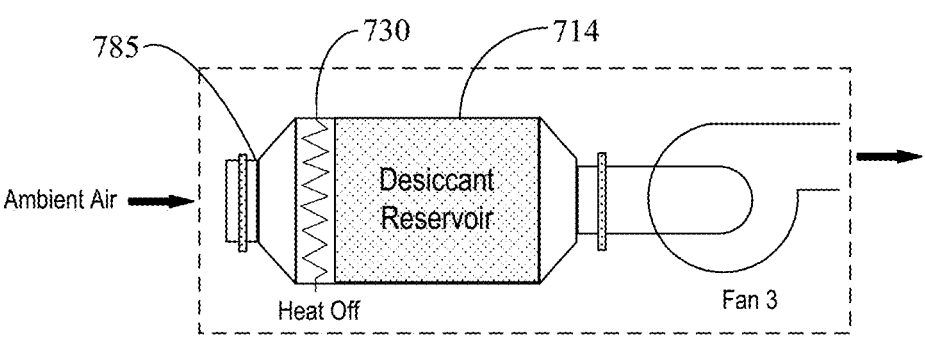

FIGS. 7A and 7B illustrate a desiccant-based dryer 702 in accordance with one or more embodiments. Similar to systems 200A, 200B, desiccant-based dryer 702 can include the elements of a dryer drum 706, desiccant reservoir 714, heater 730, a dryer fan 722, a dryer ventilation line 708, dryness sensor 726, and recharge sensor 742. The discussion above regarding these elements as it pertains to systems 200A, 200B, also applies to laundry device 702. Heater 730 can optionally be placed in the dryer ventilation line 708 to add additional heat energy to dry laundry within the drum 706. As illustrated in FIG. 7A, heater 730 can be positioned within the dryer ventilation line 708.

Different from the previously-discussed laundry devices 200A, 200B, 500A, 500B, 600, the desiccant-based dryer 702 can recharge the desiccant within desiccant reservoir 714 solely with ambient air that is pulled through inlet port 785 (e.g., louvers) via a second fan 760. Airflow may continue out through outlet port 790 (e.g., louvers).

FIG. 7B illustrates an aspect in which heater 730 can be positioned between inlet port 785 for ambient air and the desiccant reservoir 714. In one or more alternative embodiments, as illustrated in FIG. 7B, heater 730 is positioned between inlet port 685 for ambient air and desiccant reservoir 714. Heater 730 can be used to add additional heat into the ambient air, which will raise the ability of the ambient air to remove water from the desiccant within desiccant reservoir 714.

Figure 8:
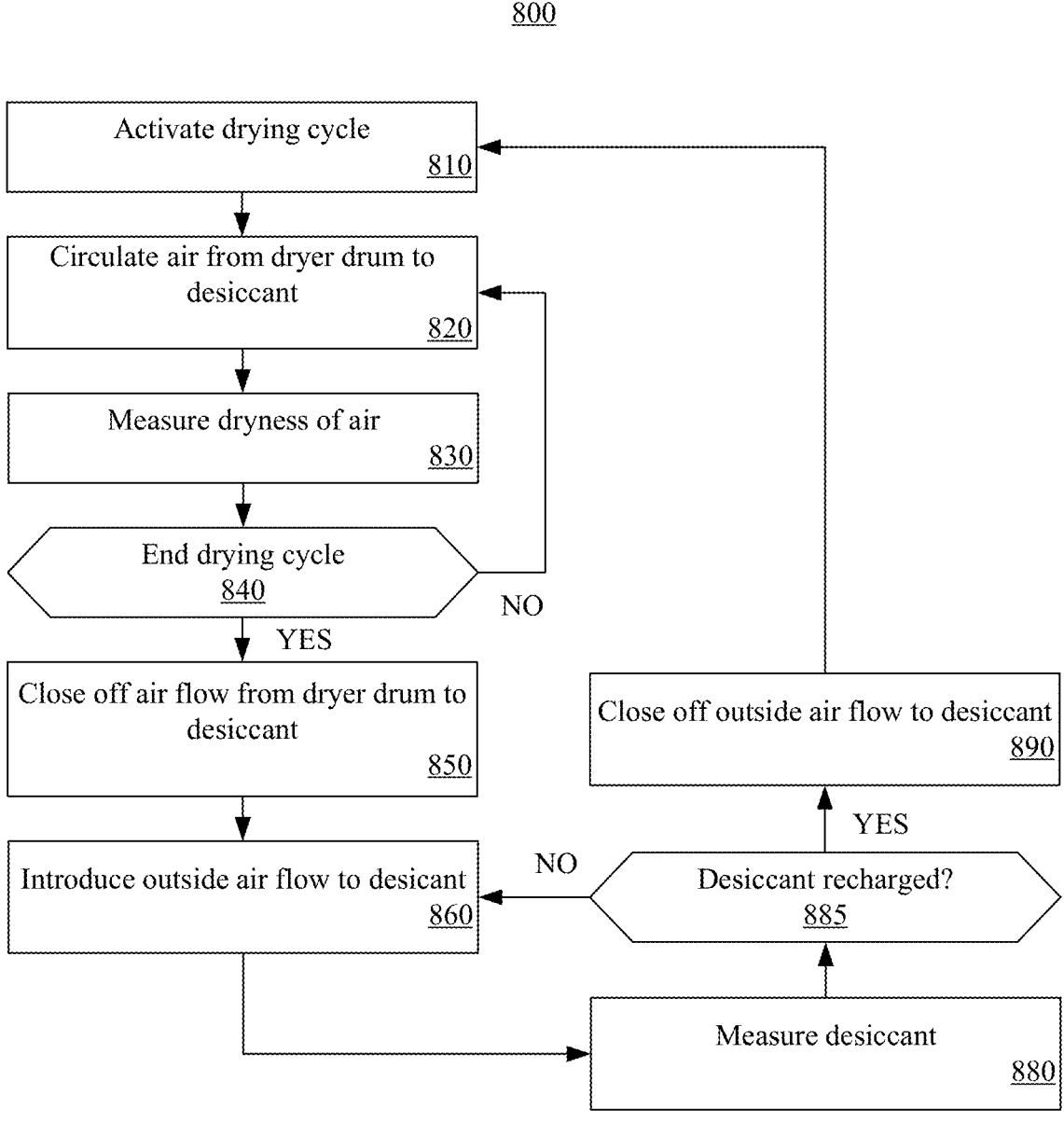
FIG. 8 is a flowchart of an example method of using the desiccant-based dryer of FIGS. 7A and 7B in accordance with one or more embodiments.

FIG. 8 is a flowchart of an example method 800 of using the desiccant-based dryer of FIGS. 7A and 7B in accordance with one or more embodiments. In the example of FIG. 8, drying cycle (e.g., blocks 810, 820, 830, 840, and 850) is nearly identical to the drying cycle (e.g., blocks 410-450) described in connection with FIG. 4. Accordingly, the discussion above regarding blocks 410-450 also applies to blocks 810-850 of FIG. 8.

The desiccant recharge cycle (e.g., block 860, 880, 885, and 890) for the desiccant-based dryer, however, differs from the desiccant recharge cycle (e.g., blocks 460-490 of FIG. 4) for the system 200. In block 860, the desiccant recharge cycle begins within ambient air being introduced through the desiccant reservoir 714. As noted, desiccant-based dryer 702 can recharge the desiccant within desiccant reservoir 714 solely with ambient air that is pulled through inlet port 785 (e.g., louvers) via a second fan 760. Alternatively, as illustrated in FIG. 7B, heater 730, as positioned between inlet port 785 for ambient air and the desiccant reservoir 714, can be used to add additional heat into the ambient air, which will raise the ability of the ambient air to remove water from the desiccant within the desiccant reservoir 714.

The ambient air has a lower humidity and can remove water from the desiccant thereby recharging the desiccant within desiccant reservoir 714. The water-laden air (from the desiccant) can then be discharged to ambient via outlet port 790. Unlike, the previously-discussed laundry devices 200A, 200B, 500A, 500B, 600, much of the energy added to the desiccant is not returned back desiccant-based dryer 702. Rather, this energy escapes to ambient via the water-laden air.

In block 880, similar to block 480 of FIG. 4, the desiccant within the desiccant reservoir 714 is measured with recharge sensor 742. In block 885, similar to block 485 of FIG. 4, a determination is made whether to end the recharge cycle. The desiccant-based dryer 702 is not limited as to a particular approach in making this determination. If a determination is made not to end the drying cycle, the process returns to block 860.

In block 890, after the determination is made to end the recharge cycle, desiccant reservoir 714 can be isolated from ambient. The desiccant-based dryer 702 is not limited to a particular approach for doing so. For example, this isolation of desiccant reservoir 714 from ambient can be accomplished using actuating dampers/valves (not shown) as previously discussed positioned within inlets/outlets of dryer ventilation line 708 to the desiccant reservoir 714. Although not illustrated, dryer ventilation line 708 can include a filter to reduce the amount of contaminants in the air that could negatively impact the desiccant in desiccant reservoir 714.

FIG. 9 is a table 900 comparing properties of various laundry drying technologies (i.e., known electric dryer, compressor-based heat pump dryer, and thermoelectric heat pump dryer) with the inventive arrangements disclosed herein (e.g., systems 200A, 200B). Without considering the energy needed to regenerate the desiccant for a next drying cycle, the net energy used for recovering the thermal energy from the water vapor is the fan energy. Consequently, at a 6.39 COP, the COP (as a measure of efficiency) of systems 200A, 200B is much higher than compressor-based heat pump dryer (2.5) and the thermoelectric heat pump dryer (1.5). This results in an overall dryer energy performance of 13.26 [lbs./kWh], which is 75% better than compressor-based heat pump dryer and 255% better than the known electrical clothes dryer. The laundry devices 200A, 200B, 500A, 500B, 600, 702 illustrated in FIGS. 2A, 2B, 5A, 5B, 6, and 7 also can provide the advantage of not requiring a flammable refrigerant, such as those employed in known compressor-based heat pump dryers.

Aside from energy efficiency, an advantage of the laundry devices 200A, 200B, 500A, 500B, 600 illustrated in FIGS. 2A, 2B, 5A, 5B, and 6 is that the system can employ ventless drying (i.e., a vent is not required because captured water during the drying process can be recycled for use with a washer). A known dryer typically hooked up to a vent leading to outside the building. However, not all homes, such as many apartments, have a hookup vent for dryers. Thus, the present ventless system can make installation easier.

Figure 10:
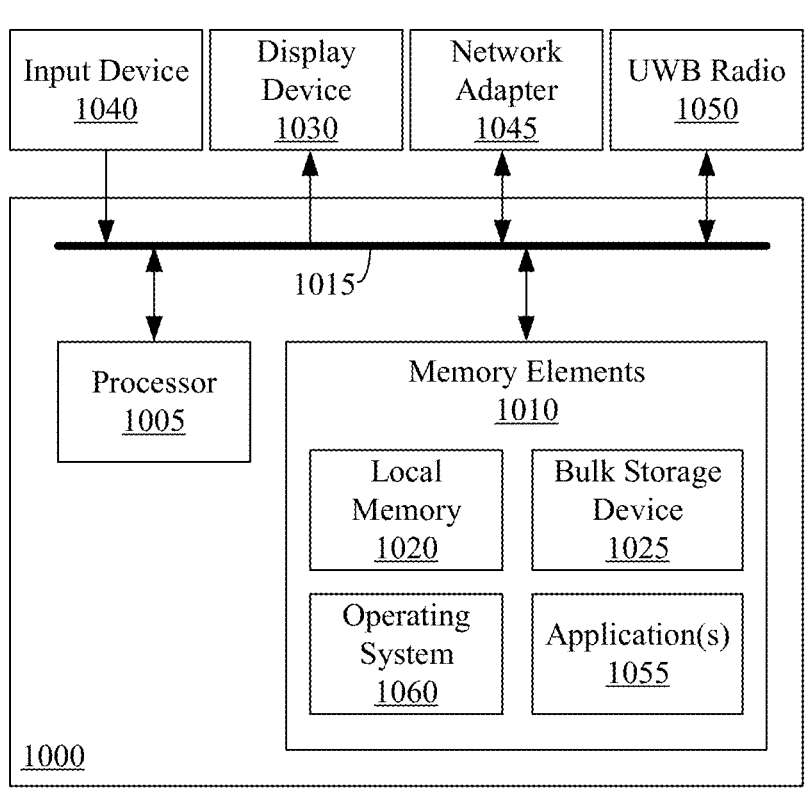
FIG. 10 is a block diagram illustrating an example of a controller for use with the example laundry devices disclosed herein.

FIG. 10 is a block diagram illustrating an example architecture for a data processing system 1000, which can be used as part of, or to implement, a controller such as controller 216 used in the laundry devices 200A, 200B, 500A, 500B, 600, 702 illustrated in FIGS. 2A, 2B, 5A, 6, and 7. The data processing system 1000 can include at least one processor 1005 (e.g., a central processing unit) coupled to memory elements 1010 through a system bus 1015 or other suitable circuitry. As such, the data processing system 1000 can store program code within the memory elements 1010. The processor 1005 can execute the program code accessed from the memory elements 1010 via the system bus 1015. It should be appreciated that the data processing system 1000 can be implemented in the form of any system including a processor and memory that is capable of performing the functions and/or operations described within this specification. For example, the data processing system 1000 can be implemented as a computer system, an embedded computer system, a system-on-chip, or the like.

Memory elements 1010 can include one or more physical memory devices such as, for example, local memory 1020 and one or more bulk storage devices 1025. Local memory 1020 refers to random access memory (RAM) or other non-persistent memory device(s) generally used during actual execution of the program code (e.g., one or more applications 1055 and/or operating system 1060). It should be appreciated that the application(s) 1055 and/or operating system 1060, upon execution, cause processor 1005 to perform and/or initiate the operations described herein. In some cases, the operating system and application may be combined as a single program that, upon execution, causes processor 1005 to perform and/or initiate the operations described herein. Bulk storage device(s) 1025 can be implemented as a hard disk drive (HDD), solid state drive (SSD), or other persistent data storage device. Data processing system 1000 also can include one or more cache memories (not shown) that provide temporary storage of at least some program code in order to reduce the number of times program code must be retrieved from the local memory 1020 and/or bulk storage device 1025 during execution.

Input/output (I/O) devices such as a display 1030 and input device 1040 (either separately or integrated together as a touchscreen for example) can be coupled to the data processing system 1000. In one or more examples, input device 1040 may include one or more buttons, dials, and/or other tactile controls. Display device 1030 may be a touchscreen. It should be appreciated that the I/O devices may be implemented as an integrated touchscreen without any tactile controls, include one or more tactile controls in combination with the touchscreen, or include a display (e.g., non-touchscreen) in combination with one or more tactile controls.

The I/O devices can be coupled to the data processing system 1000 either directly or through intervening I/O controllers. For example, the display 1030 can be coupled to the data processing system 1000 via a graphics processing unit (GPU), which may be a component of the processor 1005 or a discrete device. One or more network adapters 1045 also can be coupled to data processing system 1000 to enable the data processing system 1000 to become coupled to other systems, computer systems, remote printers, and/or remote storage devices through intervening private or public networks. Modems, cable modems, transceivers, and Ethernet cards are examples of different types of network adapters 1045 that can be used with data processing system 1000. Data processing system 1000 can also include Ultra-Wideband (UWB) radio 1050, which is configured to both send and receive wireless, very low energy level signals suitable for short-range, high-bandwidth communications over a large portion of the radio spectrum.

The terminology used herein is for the purpose of describing particular embodiments only and is not intended to be limiting. Notwithstanding, several definitions that apply throughout this document are expressly defined as follows.

As defined herein, the singular forms "a," "an," and "the" are intended to include the plural forms as well, unless the context clearly indicates otherwise.

As defined herein, the terms "at least one," "one or more," and "and/or," are open-ended expressions that are both conjunctive and disjunctive in operation unless explicitly stated otherwise. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without human intervention.

As defined herein, the term "computer readable storage medium" means a storage medium that contains or stores program code for use by or in connection with an instruction execution system, apparatus, or device. As defined herein, a "computer readable storage medium" is not a transitory, propagating signal per se. A computer readable storage medium may be, but is not limited to, an electronic storage device, a magnetic storage device, an optical storage device, an electromagnetic storage device, a semiconductor storage device, or any suitable combination of the foregoing. The different types of memory, as described herein, are examples of a computer readable storage media. A non-exhaustive list of more specific examples of a computer readable storage medium may include: a portable computer diskette, a hard disk, a random-access memory (RAM), a read-only memory (ROM), an erasable programmable read-only memory (EPROM or Flash memory), a static random-access memory (SRAM), a portable compact disc read-only memory (CD-ROM), a digital versatile disk (DVD), a memory stick, a floppy disk, or the like.

As defined herein, "data processing system" means one or more hardware systems configured to process data, each hardware system including at least one processor programmed to initiate operations and memory.

As defined herein, "execute" and "run" comprise a series of actions or events performed by the processor in accordance with one or more machine-readable instructions. "Running" and "executing," as defined herein refer to the active performing of actions or events by the processor. The terms run, running, execute, and executing are used synonymously herein.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the terms "individual" and "user" each refer to a human being.

As defined herein, the term "processor" means at least one hardware circuit (i.e., a hardware processor). The hardware circuit may be configured to carry out instructions contained in program code. The hardware circuit may be an integrated circuit. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "responsive to" and similar language as described above, (e.g., "if," "when," or "upon,") mean responding or reacting readily to an action or event. The response or reaction is performed automatically. Thus, if a second action is performed "responsive to" a first action, there is a causal relationship between an occurrence of the first action and an occurrence of the second action. The term "responsive to" indicates the causal relationship.

As defined herein, "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

The terms first, second, etc. may be used herein to describe various elements. These elements should not be limited by these terms, as these terms are only used to distinguish one element from another unless stated otherwise or the context clearly indicates otherwise.

A computer program product may include a computer readable storage medium (or media) having computer readable program instructions thereon for causing a processor to carry out aspects of the present disclosure. Within this disclosure, the term "program code" is used interchangeably with the term "computer readable program instructions." Computer readable program instructions described herein may be downloaded to respective computing/processing devices from a computer readable storage medium or to an external computer or external storage device via a network, for example, the Internet, a LAN, a WAN and/or a wireless network. The network may include copper transmission cables, optical transmission fibers, wireless transmission, routers, firewalls, switches, gateway computers and/or edge devices including edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations for the inventive arrangements described herein may be assembler instructions, instruction-set-architecture (ISA) instructions, machine instructions, machine dependent instructions, microcode, firmware instructions, or either source code or object code written in any combination of one or more programming languages, including an object-oriented programming language and/or procedural programming languages. Computer readable program instructions may specify state-setting data. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some cases, electronic circuitry including, for example, programmable logic circuitry, an FPGA, or a PLA may execute the computer readable program instructions by utilizing state information of the computer readable program instructions to personalize the electronic circuitry, in order to perform aspects of the inventive arrangements described herein.

Certain aspects of the inventive arrangements are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, may be implemented by computer readable program instructions, e.g., program code.

These computer readable program instructions may be provided to a processor of a computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. In this way, operatively coupling the processor to program code instructions transforms the machine of the processor into a special-purpose machine for carrying out the instructions of the program code. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the operations specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various aspects of the inventive arrangements. In this regard, each block in the flowcharts or block diagrams may represent a module, segment, or portion of instructions, which comprises one or more executable instructions for implementing the specified operations. In some alternative implementations, the operations noted in the blocks may occur out of the order noted in the figures. For example, two blocks shown in succession may be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts or carry out combinations of special purpose hardware and computer instructions.

The corresponding structures, materials, acts, and equivalents of all means or step plus function elements that may be found in the claims below are intended to include any structure, material, or act for performing the function in combination with other claimed elements as specifically claimed.

Modifications and variations may be apparent to those of ordinary skill in the art without departing from the scope and spirit of the described inventive arrangements. Accordingly, reference should be made to the following claims, rather than to the foregoing disclosure, as indicating the scope of such features and implementations.

What is claimed is:

1. A washer/dryer system, comprising:
   a washer ventilation line including a washer air input line and a washer air output line;
   a dryer ventilation line including a dryer air input line and a dryer air output line;
   a washer including a washer drum connected to the washer ventilation line;
   a dryer including a dryer drum connected to the dryer ventilation line; and
   a desiccant reservoir;
   wherein each of the washer air input line, the washer air output line, the dryer air input line, and the dryer air output line is connected to the desiccant reservoir.

2. The washer/dryer system of claim 1, wherein ambient air or air from the washer is circulated through the desiccant reservoir thereby recharging desiccant contained therein.

3. The washer/dryer system of claim 1, wherein:
   in a first configuration, a first fan is configured to cycle air through the dryer ventilation line; and
   in a second configuration, a second fan is configured to cycle air through the washer ventilation line.

4. The washer/dryer system of claim 3, further comprising:
   a heater positioned within the washer ventilation line.

5. The washer/dryer system of claim 3, further comprising:
   a dehumidifier positioned within the washer ventilation line.

6. The washer/dryer system of claim 5, further comprising a water reservoir for the washer, wherein the dehumidifier is configured to introduce air from the washer air input line into water contained within the water reservoir.

7. The washer/dryer system of claim 1, wherein the desiccant reservoir includes a molecular sieve desiccant.

8. The washer/dryer system of claim 1, wherein the desiccant reservoir includes a liquid desiccant.

9. A laundry device, comprising:
   a ventilation line including an air input line and an air output line;
   a drum connected to the ventilation line;
   a dehumidifier; and
   a desiccant reservoir;
   wherein the air input line and the air output line are connected to the desiccant reservoir; and
   wherein the dehumidifier is connected to the desiccant reservoir.

10. The laundry device of claim 9, wherein ambient air is circulated through the desiccant reservoir thereby recharging desiccant contained therein.

11. The laundry device of claim 9, further comprising:
    a first fan configured to cycle air through the ventilation line.

12. The laundry device of claim 11, further comprising:
    a heater within the ventilation line.

13. The laundry device of claim 11, wherein the dehumidifier is positioned within a washer ventilation line that connects the desiccant reservoir to a washer drum.

14. The laundry device of claim 11, further comprising:
    a second fan configured to pull ambient air through the desiccant reservoir;
    wherein the drum is a dryer drum.

15. The laundry device of claim 9, further comprising:
    a heater positioned within the ventilation line;
    wherein the drum is a combination washer/dryer drum; and
    wherein the heater is configured to be operational during a washing cycle and non-operational in a drying cycle.

16. The laundry device of claim 9, wherein the desiccant reservoir includes a molecular sieve desiccant.

17. The laundry device of claim 9, wherein the desiccant reservoir includes a liquid desiccant.

18. A method, comprising:
    during a drying cycle of a dryer system, cycling air, conveyed by a dryer ventilation line, from a dryer drum of the dryer system through a desiccant reservoir coupled to the dryer ventilation line;
    during the drying cycle of the dryer system, cycling air from the desiccant reservoir back into the dryer drum; and
    performing at least one of:
       circulating ambient air through the desiccant reservoir thereby recharging a desiccant contained in the desiccant reservoir; or
       circulating air from a washer conveyed through a washer ventilation line through the desiccant reservoir thereby recharging the desiccant contained in the desiccant reservoir.

19. The method of claim 18, further comprising:
    applying heat to the air in the washer ventilation line using a heater positioned in the washer ventilation line.

20. The method of claim 18, further comprising:
    dehumidifying the air in the washer ventilation line using a dehumidifier positioned within the washer ventilation line.

* * * * *